(12) United States Patent
Grevers et al.

(10) Patent No.: US 8,383,718 B2
(45) Date of Patent: Feb. 26, 2013

(54) PIGMENTED STRIP PAINT

(75) Inventors: Johan Justus Grevers, Alphen a/d Rijn (NL); Jan Zoer, Epe (NL)

(73) Assignee: Akzo Nobel Coatings International B.V., Arnhem (NL)

( * ) Notice: Subject to any disclaimer, the term of this patent is extended or adjusted under 35 U.S.C. 154(b) by 1598 days.

(21) Appl. No.: 11/587,778

(22) PCT Filed: Apr. 26, 2005

(86) PCT No.: PCT/EP2005/051875
§ 371 (c)(1),
(2), (4) Date: Mar. 2, 2007

(87) PCT Pub. No.: WO2005/103171
PCT Pub. Date: Nov. 3, 2005

(65) Prior Publication Data
US 2008/0139732 A1    Jun. 12, 2008

(30) Foreign Application Priority Data
Apr. 27, 2004 (EP) .................... 04076268

(51) Int. Cl.
*C08G 18/52* (2006.01)
*C08G 65/00* (2006.01)
*C08L 29/00* (2006.01)
*C08L 71/00* (2006.01)
*C09D 5/00* (2006.01)

(52) U.S. Cl. .......... 524/500; 524/507; 524/556

(58) Field of Classification Search .................. 524/500, 524/507, 556; 156/344; 428/195.1, 40.1, 428/31, 423.1; 521/82, 170; 523/124; 106/499; 510/201, 206
See application file for complete search history.

(56) References Cited

U.S. PATENT DOCUMENTS

| 5,326,808 | A  | * | 7/1994 | Floyd et al. .................. 524/457 |
| 5,965,195 | A  |   | 10/1999 | Muller et al. |
| 6,482,885 | B1 | * | 11/2002 | Muller et al. ................. 524/501 |
| 2002/0077377 | A1 | * | 6/2002 | Zhang et al. ................... 521/82 |
| 2003/0094592 | A1 |   | 5/2003 | Gertzmann et al. |

FOREIGN PATENT DOCUMENTS

| WO | WO 97/19120 | 5/1997 |
| WO | WO 97/45496 | 12/1997 |
| WO | WO 00/52106 | 9/2000 |
| WO | WO 03/060020 | 7/2003 |

* cited by examiner

*Primary Examiner* — Ling Choi
*Assistant Examiner* — Darcy D Laclair
(74) *Attorney, Agent, or Firm* — Kenyon & Kenyon LLP

(57) ABSTRACT

Aqueous strippable paint comprising one or more pigments, a polyether polyurethane binder having anionic stabilizing groups, and a second polyether having at least 20 wt. % of lipophilic parts. The first polyether has an acid number of at least 8, preferably at least 12, and the second polyether has 30-70 wt % of lipophilic parts. The mixing ratio of the first and second polyethers is at least 20:1. The second polyether comprises a lipophilic polyester and/or polyurethane backbone. The polyether polyurethane binder has a Tg of less than $-42°$ C.

12 Claims, No Drawings

PIGMENTED STRIP PAINT

The present invention relates to a pigmented coating composition which is suitable for application as a strippable paint film for temporarily decorating a non-porous substrate.

Such coatings can be used for temporary removable paint decorations for special occasions, such as a wedding, soccer contests, carnival, national events, etc. These paints are particularly suitable for use on cars. When applied on a non-porous substrate, such as a metal or plastic substrate or a paint film, the paint forms a film with an internal cohesion which is higher than the adhesion to the substrate, allowing easy removal by stripping from the substrate. Examples of such strippable paints are disclosed in WO 97/45496 and WO 03/060020.

Aqueous strippable paints are generally acrylic emulsion paints. To prevent settling of the emulsified acrylate binder, the paints are stabilized by hydrophilic compounds. A generally used stabilizer is polyvinyl alcohol. A drawback of the use of such hydrophilic compounds is that the paint film attracts moisture, resulting in the formation of blisters and spontaneous separation from the substrate. Further, the use of polyvinyl alcohol results in hazy paint films.

It is an object of the present invention to provide a paint composition in which emulsion stability is balanced with sufficient paint film water resistance without the need to use additional hydrophilic additives, such as polyvinyl alcohol.

The object of the invention is achieved by an aqueous paint composition comprising one or more pigments, a polyether binder having anionic stabilizing groups, and a second polyether having at least 20 wt. % of lipophilic parts, the mixing ratio of the first and second polyethers being at least 20:1. It has been found that using such combination of polyethers in an aqueous composition allows a sufficiently high pigment content without the need for additional measures to maintain stability. The obtained paint films show satisfactory water resistance.

The first polyether can have an acid number of, e.g., at least 8, preferably at least 12. The anionic groups can be carboxyl groups, sulfonate groups, phosphate groups or any other suitable anionic group or combinations thereof. These anionic groups can be neutralized by basic compounds which are preferably volatile. Particularly suitable are ammonium or volatile amines such as triethylamine.

The second polyether has at least 20 wt. %, e.g., 30-70 wt % of lipophilic parts. Lipophilic parts are parts without polar groups, such as aliphatic hydrocarbon parts of four or more carbon atoms.

To enable a user to remove the paint film in one piece, the paint film must have sufficient elasticity combined with reasonable tensile strength. To obtain a paint film with a favorable combination of elasticity and tensile strength, use can be made of a polyether binder having a Tg of less than −30° C. preferably less than −42° C.

It has been found that polyurethane polyethers are particularly suitable as binders in the composition according to the invention, resulting in improved mechanical properties. Such resins can for example be prepared by the condensation reaction of an isocyanate and a polyether polyol. Commercially available examples of suitable polyether polyurethanes are NeoRez R-970, NeoRez R-987 and NeoRez R-1007, all available from NeoResins, Waalwijk, the Netherlands. A recipe for a temporary peelable metal coating comprising NeoRez R-970 was published by NeoResins as "Formulation D-735". However, this composition is an unpigmented composition for use as a temporary protective strip lacquer.

The second polyether may for example comprise a polyester backbone. Such a compound can for instance be the reaction product of an epoxy functional polyester and a polyoxyalkylene monoamine such as compounds of the Jeffamine® M series, available from Texaco Chemical Company.

Alternatively, the second polyether may for example comprise a polyurethane backbone. Suitable polyurethane polyethers and their preparation are for instance disclosed in WO 97/19120.

The second polyether can have an acid number below 4 or be substantially non-ionic. Suitable polyethers can have an HLB value of at least 5, e.g., 9 or more, the HLB value being a number equal to 20 times the weight ratio of the hydrophilic parts and the sum of hydrophilic and lipophilic parts. The polyether suitably has a number average molecular weight Mn below 40000, e.g. of 1000-12000.

The coating composition according to the present invention can be used with organic or inorganic pigments, such as titanium dioxide, carbon black, zinc oxide, yellow or red iron oxides, raw and burnt sienna or umber, chromium oxide green, phthalocyanine green, phthalonitrile blue, ultramarine blue, or chromium pigments. Also the use of matting agents such as silicas and of fillers such as calcium carbonate and talcum is possible. Optionally, effect pigments such as aluminium or pearlescent flakes or dichroic pigments may be used, either alone or in combination with one or more other pigments. The paint can be applied by brush, roller, sprayer, or by any other suitable applicator. Preferably, the paint should be applied in a layer of equal and sufficient thickness to improve the strippability of the paint film. The paint can be applied to non-porous substrates such as metal, glass, or plastic substrates which can be pre-coated or not. Pre-coated substrates can for instance be pre-coated with multi-layer coating systems including a clear top coat, as is generally the case with automotive substrates. The paint is particularly suitable to apply a temporary decoration on cars or other vehicles.

The paint composition according to the present invention can for example have a minimum film-forming temperature MFT below 0° C.

EXAMPLE 1

A reaction product of a polyoxyalkylene monoamine (Jeffamine® M-1000 from Texaco) and a low molecular weight monoepoxide (Cardura® E10 from Shell) are added to an epoxy functional acrylic lipophilic pre-polymer in an equimolar ratio. The reaction mixture is kept at 80° C. for seven hours. The resulting polyether has an HLB value of 8.9. An aqueous pigment dispersion is made of Novoperm® Orange HL 70, an orange pigment available from Clariant, and 3% by weight of the polyether. Subsequently, 10 parts by weight of the pigment dispersion are mixed with 84 parts by weight of NeoRez® R-1007, an aqueous dispersion of an anionic polyether polyurethane. A polydimethyl siloxane is then added in an amount of 1 part by weight, together with 2.5 parts by weight of water. The weight ratio of the NeoRez polyether to the lipophilic polyether was above 100:1.

After application by brush on a pre-coated metal substrate, a paint film is formed of a bright colour without a shade of haziness or blisters. The paint film is easily removable by stripping by hand in a single piece.

EXAMPLE 2

A mixture is made of the following compounds:

| | |
|---|---|
| 194.7 g | Tegomer ® D-3123 (a polyether-1,3-propanediol available from Goldschmidt AG, Germany) |
| 344.6 g | NaHSO$_3$, |
| 348.0 g | Reaction product of an unsaturated fatty acid (having 65 wt. % of conjugated linoleic acid) and propylene oxide (acid number <1, Mw = 348), and |
| 100.0 g | o-xylene. |

The mixture is heated to about 130° C., with solvent being distilled off under reduced pressure. After cooling to about 50° C., a mixture of 222 g of isophorone diisocyanate, and 70 g of methylethyl ketone are added to the reaction mixture, after which the reaction mixture is kept at 120° C. for 2 hours. Dibutyl tin diacetate (5 or 6 drops) is added, and the reaction is maintained at 120° C. for 3 hours. 1-Methoxypropanol-2 (265.3 g) is added, and the reactor contents are cooled to ambient temperature. The prepared polyether polyurethane has a solids content of about 75 wt. %.

Subsequently, 0.45 g LiOH.H$_2$O is added to 400 g of the polyether polyurethane. The mixture is heated to 130° C., and all solvents are distilled off under reduced pressure. The mixture is cooled to about 90° C., and 670 g demineralised water are added over a period of 3 hours with vigorous stirring of the contents of the reaction flask while the temperature is gradually lowered to ambient. A dispersion is obtained having a solids content of about 31 wt. % and a viscosity of about 1.9 Pa·s. The pH is 7.9.

The dispersion is then pigmented by mixing in 67.5 wt. % of titanium dioxide (Tiona® 535, available from Millennium Chemicals). Subsequently, 10 parts by weight of the pigment dispersion are mixed with 84 parts by weight of NeoRez® R-970, which has a solids content of 39% by weight. A siloxane is added in an amount of 1 part by weight, together with 2.5 parts by weight of water and 2.5 parts by weight of Borchigel® LW 44, a rheology modifier of Borchers, Germany. In the resulting product, the mixing ratio of the first and second polyethers was above 30:1.

EXAMPLE 3

A mixture is prepared of the following compounds:

| | |
|---|---|
| 194.7 g | Tegomer ® D-3403 (a polyether-1,3-propanediol available from Goldschmidt AG, Germany) |
| 344.6 g | NaHSO$_3$, |
| 348.0 g | Reaction product of an unsaturated fatty acid (having 65 wt. % of conjugated linoleic acid) and propylene oxide (acid number <1, Mw = 348), and |
| 100.0 g | o-xylene. |

The mixture is heated to about 130° C., with solvent being distilled off under reduced pressure. After cooling to about 50° C., a mixture of 222 g of isophorone diisocyanate and 70 g of methyl ethyl ketone is added to the reaction mixture, after which the reaction mixture is kept at 120° C. for 2 hours. Dibutyl tin diacetate (5 or 6 drops) is added and the reaction is maintained at 120° C. for 3 hours. 1-Methoxypropanol-2 (265.3 g) is added, and the reactor contents are cooled to ambient temperature. The prepared polyether polyurethane has a solids content of about 75 wt. %.

Subsequently, 0.3 g LiOH.H$_2$O and 70 g of methylethyl ketone are added to 400 g of the polyether polyurethane. The mixture is heated to 130° C., and all solvents are distilled off under reduced pressure. After completion of the reaction, the reactor contents are diluted with 265.3 g of 1-methoxypropanol-2. The mixture is cooled to about 90° C., and 700 g demineralised water are added over a period of 3 hours with vigorous stirring of the contents of the reaction flask while the temperature is gradually lowered to ambient. Obtained is a dispersion having a solids content of about 30 wt. % and a viscosity of about 0.82 Pa·s. The pH is 7.6.

The dispersion is pigmented by mixing in 12.5% by weight of Hostaperm® Scharlach GO, an organic orange pigment available from Clariant. Subsequently, 10 parts by weight of the dispersion are mixed with 84 parts by weight of NeoRez® R-970. A siloxane is added in an amount of 1 part by weight, together with 2.5 parts by weight of water and 2.5 parts by weight of Acrysol® RM2020.

As in the previous examples, a paint film of a bright colour is formed without a shade of haziness or blisters. The paint film is easily removable by stripping by hand in a single piece.

EXAMPLE 4

The following compounds are weighed into a 2 l reaction flask:

| | |
|---|---|
| 194.7 g | Tegomer ® D-3403 (a polyether-1,3-propanediol available from Goldschmidt AG, Germany), |
| 344.6 g | NaHSO$_3$, |
| 267.0 g | Oleyl/linoleyl alcohol (available from Henkel under the trade designation HD-Ocenol 110/130), and |
| 100.0 g | o-xylene. |

The mixture is heated to about 130° C., with solvent being distilled off under reduced pressure. After cooling to about 50° C. a mixture of 222 g of isophorone diisocyanate and 64.3 g of methylethyl ketone is added to the reaction mixture, after which the reaction mixture is kept at 120° C. for 2 hours. Dibutyl tin diacetate (5 or 6 drops) is added, and the reaction is maintained at 120° C. for 3 hours. 1-Methoxypropanol-2 (244 g) is added, and the reactor contents are cooled to ambient temperature. The prepared polyether polyurethane has a solids content of about 75 wt. %.

Subsequently, 0.225 g LiOH.H$_2$O and 70 g of methylethyl ketone are added to 400 g of the polyether polyurethane. The mixture is heated to 130° C., and all solvents are distilled off under reduced pressure. After completion of the reaction, the reactor contents are diluted with 265.3 g of 1-methoxypropanol-2. The mixture is cooled to about 90° C., and 700 g demineralised water are added over a period of 3 hours with vigorous stirring of the contents of the reaction flask while the temperature is gradually lowered to ambient. A dispersion is obtained having a solids content of about 30 wt. % and a viscosity of about 0.91 Pa·s. The pH is 7.4.

The dispersion is then pigmented by mixing in 42.0 wt. % of Irgacolor® 10446, a blue pigment available from Ciba. Subsequently, 10 parts by weight of the dispersion are mixed with 84 parts by weight of NeoRez® R-987. A siloxane compound is added in an amount of 1 part by weight, together with 2.5 parts by weight of water and 2.5 parts by weight of Acrysol® RM2020.

EXAMPLE 5

The following compounds are weighed into a 2 l reaction flask:

| | |
|---|---|
| 194.7 g | Tegomer ® D-3403 (a polyether-1,3-propanediol available from Goldschmidt AG, Germany), |
| 334.6 g | NaHSO$_3$, |
| 133.5 g | Oleyl alcohol (HD Ocenol ® 90/95), |
| 500.0 g | Polypropylene glycol (Mw = 2000), and |
| 100.0 g | o-xylene. |

The mixture is heated to about 130° C., with solvent being distilled off under reduced pressure. After cooling to about 50° C. a mixture of 222 g of isophorone diisocyanate and 66.2 g of methylethyl ketone is added to the reaction mixture, after which the reaction mixture is kept at 120° C. for 2 hours. Dibutyl tin diacetate (5 or 6 drops) is added, and the reaction is maintained at 120° C. for 3 hours. 1-Methoxypropanol-2 (251.3 g) is added, and the reactor contents are cooled to ambient temperature. The prepared polyether polyurethane has a solids content of about 75 wt. %.

Subsequently, 0.18 g LiOH.H$_2$O and 70 g of methylethyl ketone are added to 400 g of the polyether polyurethane. The mixture is heated to 130° C., and all solvents are distilled off under reduced pressure. After completion of the reaction, the reactor contents are diluted with 265.3 g of 1-methoxypropanol-2. The mixture is cooled to about 90° C., and 700 g demineralised water are added over a period of 3 hours with vigorous stirring of the contents of the reaction flask while the temperature is gradually lowered to ambient. Obtained is a dispersion having a solids content of about 30 wt. % and a viscosity of about 0.82 Pa·s. The pH is 7.0.

The dispersion is pigmented by mixing in 58 wt. % of Sicopal® L1150, a yellow pigment, available from BASF. Subsequently, 10 parts by weight of the dispersion are mixed with 84 parts by weight of NeoRez® R-987. A polyether siloxane is added in an amount of 1 part by weight, together with 2.5 parts by weight of water and 2.5 parts by weight of Acrysol® RM2020.

The invention claimed is:

1. Aqueous paint composition comprising one or more pigments, a polyether binder having anionic stabilizing groups, and a second polyether having at least 20 wt. % of lipophilic parts, the mixing ratio of the first and second polyethers being at least 20:1 parts by weight.

2. Paint composition according to claim 1, wherein the first polyether has an acid number of at least 8 and the second polyether has 30-70 wt % of lipophilic parts.

3. Paint composition according to claim 1, wherein the first polyether is a polyether polyurethane.

4. Paint composition according to claim 1, wherein the second polyether comprises a lipophilic polyester and/or polyurethane backbone.

5. Paint composition according to claim 1, wherein the polyether binder has a Tg of less than −30° C.

6. Paint composition according to claim 1, wherein the number average molecular weight Mn of the second polyether is less than 40,000.

7. Paint composition according to claim 1, wherein it has a minimum film-forming temperature MFT below 0° C.

8. A peelable coating on a substrate prepared from a coating composition according to claim 1.

9. A peelable coating according to claim 8 wherein the substrate is a pre-coated metal or plastic substrate.

10. A peelable coating according to claim 9 wherein the substrate is precoated with a multi-layer coating with a clear top coat.

11. Paint composition according to claim 2, wherein the first polyether has an acid number of at least 12.

12. Paint composition according to claim 5, wherein the polyether binder has a Tg of less than −42° C.

* * * * *

UNITED STATES PATENT AND TRADEMARK OFFICE
CERTIFICATE OF CORRECTION

PATENT NO.       : 8,383,718 B2
APPLICATION NO.  : 11/587778
DATED            : February 26, 2013
INVENTOR(S)      : Grevers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1722 days.

Signed and Sealed this
First Day of September, 2015

Michelle K. Lee
*Director of the United States Patent and Trademark Office*